(12) United States Patent
Sasaoka et al.

(10) Patent No.: US 7,995,198 B2
(45) Date of Patent: Aug. 9, 2011

(54) OPTICAL FIBER FEATURE DISTRIBUTION SENSOR

(75) Inventors: Eisuke Sasaoka, Yokohama (JP);
Yoshinori Yamamoto, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 342 days.

(21) Appl. No.: 12/438,464

(22) PCT Filed: Aug. 21, 2007

(86) PCT No.: PCT/JP2007/066188
§ 371 (c)(1),
(2), (4) Date: Feb. 23, 2009

(87) PCT Pub. No.: WO2008/023699
PCT Pub. Date: Feb. 28, 2008

(65) Prior Publication Data
US 2010/0238427 A1 Sep. 23, 2010

(30) Foreign Application Priority Data
Aug. 24, 2006 (JP) ................... 2006-227992

(51) Int. Cl.
*G01N 21/00* (2006.01)
(52) U.S. Cl. ..................................................... 356/73.1
(58) Field of Classification Search ................. 356/73.1, 356/300
See application file for complete search history.

(56) References Cited

U.S. PATENT DOCUMENTS
2002/0122169 A1* 9/2002 Lee et al. .................... 356/73.1

FOREIGN PATENT DOCUMENTS
JP 2000-180265 6/2000
JP 2003-98037 4/2003
JP 2003-322588 11/2003

OTHER PUBLICATIONS

Hotate et al., "Simplified System of Fiber Brillouin Optical Correlation Domain Analysis for Distributed Strain Sensing", The 16th Optical Fiber Sensor International Conference (OFS-16), We2-3, pp. 290-293 (Oct. 2003).

* cited by examiner

*Primary Examiner* — Tarifur Chowdhury
*Assistant Examiner* — Abdullahi Nur
(74) *Attorney, Agent, or Firm* — Venable LLP; Michael A. Sartori

(57) ABSTRACT

The present invention relates to an optical fiber characteristic distribution sensor comprising a structure to effectively reduce the measurement errors of position in the temperature distribution measurement etc. The sensor comprises an optical fiber section, part of which is installed in an object to be measured and to which probe light and pumping light are inputted in opposite directions. The optical fiber section includes a marker portion where data relating to the shape of a BGS in the maker has been preliminarily measured in a state where the optical fiber section is installed in a normal state. At the time of calculating the characteristic distribution in the longitudinal direction of the optical fiber section while measuring the data relating to the BGS shape, the errors of the calculated gain occurrence position are corrected, for example, by shifting the scanning range of phase difference between the probe light and the pumping light. The amount of shift of the scanning range of phase difference is given based on a difference value between the phase difference at the time of measurement when the BGS that reflects the gain that has occurred in the marker portion is measured, and the reference phase difference when data relating to the already known shape of the BGS in the marker portion has been preliminarily measured.

7 Claims, 4 Drawing Sheets

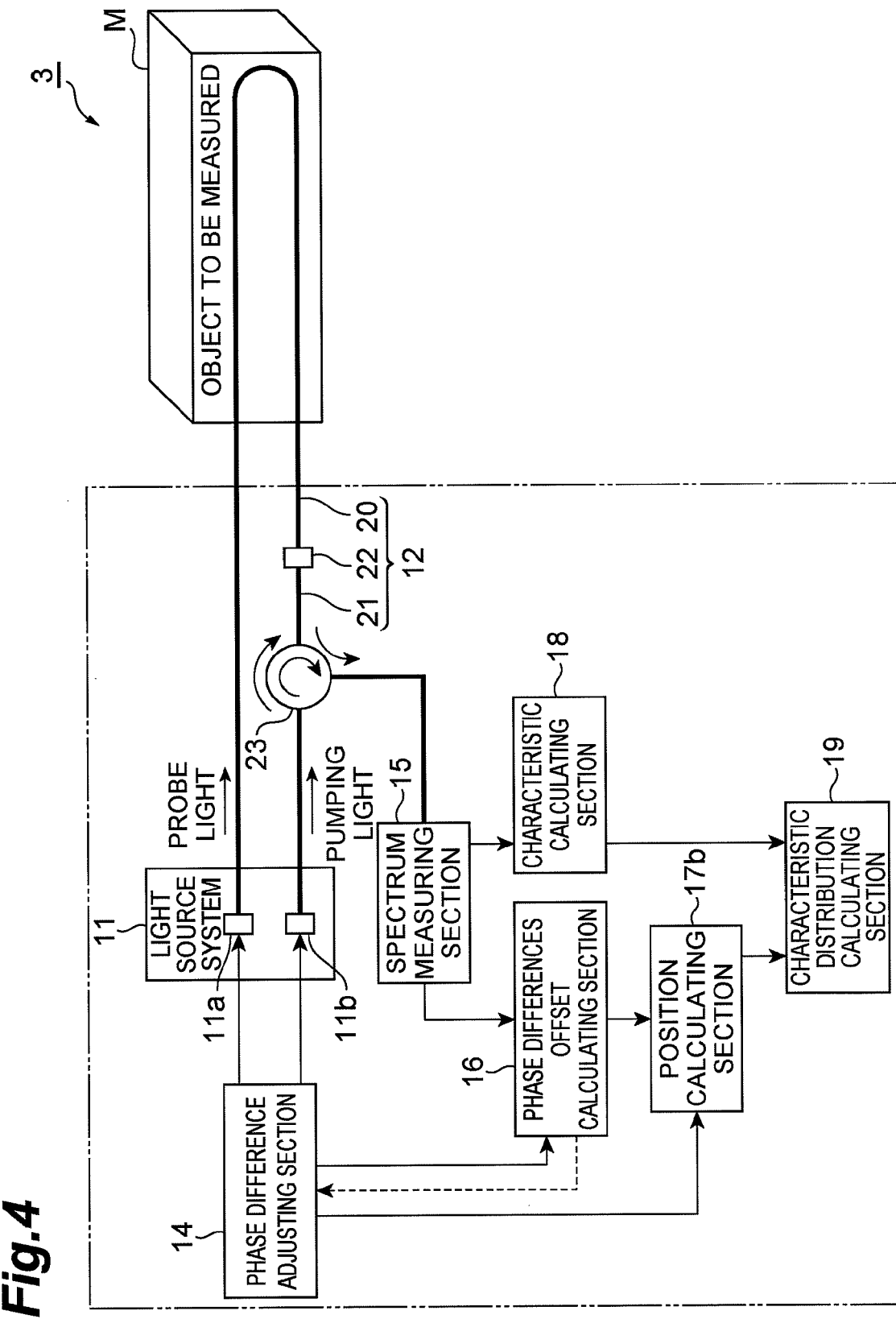

OPTICAL FIBER FEATURE DISTRIBUTION SENSOR

TECHNICAL FIELD

The present invention relates to an optical fiber characteristic distribution sensor that measures temperature or distortion by utilizing the gain due to the Brillouin scattering outputted from an optical fiber.

BACKGROUND ART

The shape of a Brillouin gain spectrum (which will be referred to hereinafter as "BGS") in which the gain resulting from the Brillouin scattering that has occurred in an optical fiber changes according to the temperature and distortion at the position where the gain has occurred due to the Brillouin scattering in the optical fiber. A technique is known, which measures temperature and distortion by utilizing the change.

In the following non-patent document 1, a technique is described, which measures the distortion of an optical fiber using the BOCDA (Brillouin Optical Correlation Domain Analysis). The BOCDA is a technique to cause a gain to occur at a position where both phases of probe light and pumping light caused to enter both ends of a measuring optical fiber in opposite directions match with each other in the measuring optical fiber. In the technique described in the following non-patent document 1, a gain is caused to occur at each position of the measuring optical fiber by changing the phase difference between probe light and pumping light and thus the distribution of distortion of the measuring optical fiber is found by measuring the BGS of each gain.
Non-patent document 1: Kazuo HOTATE, et al., "Simplified System of Fiber Brillouin Optical Correlation Domain Analysis for Distributed Strain Sensing", The 16-th Optical Fiber Sensor International Conference (OFS-16), October, 2003, We2-3, p. 290-293.

DISCLOSURE OF THE INVENTION

Problems that the Invention is to Solve

The present inventors have examined the above prior art, and as a result, have discovered the following problems. That is, in the BOCDA described in the above non-patent document 1, the phase difference between probe light and pumping light is set as follows. First, an injection current is outputted from a waveform generator, which has been modulated in frequency or amplitude in accordance with an indication value that specifies the phase difference. Such an outputted injection current is inputted into a DFB-LD and the probe light and the pumping light modulated in optical frequency, respectively, are outputted. The outputted probe light is inputted into a measuring optical fiber via a delaying optical fiber.

However, the injection current outputted from the waveform generator according to the indication value and the optical frequency response characteristic of DFB-LD to the injection current change with the passage of time. Consequently, the actual value of the phase difference between the pumping light and probe light outputted from the DFB-LD changes with respect to the indication value with time.

In addition, the change in tensile given to the delaying optical fiber or the change in temperature will cause the optical path length of the probe light to change. When the optical path length of the probe light changes, the phase of the probe light when it enters the measuring optical fiber will change.

Because of these factors, the phase difference at each position in the measuring optical fiber changes from the set value to another and therefore the temperature measurement position calculated based on the phase difference indicated by the indication value and the delay given by the delaying optical fiber shifts. In this case, an error is caused in the temperature distribution measurement based on the BGS shape.

The present invention has been developed to eliminate the problems described above. It is an object of the present invention to provide an optical fiber characteristic distribution sensor comprising a structure capable of effectively reducing measurement errors at a position of the measurement of characteristic distribution, such as temperature distribution and distortion distribution.

Means for Solving the Problems

The optical fiber characteristic distribution sensor according to the present invention comprises an optical fiber section including a marker portion the position of which in the longitudinal direction is already known and the BGS change of which at the position is also already known, comprising a structure for correcting measurement errors resulting from the circumstances where the information about the position at which the marker portion has been measured in the optical fiber section is different from the already known information about the position. The methods of correcting errors include a method of correcting the phase difference between probe light and pumping light such that the information about the position at which the marker portion has been measured and the already known information about the position match with each other, and a method of correcting the position measurement result based on the shift between the information about the position at which the marker portion has been measured and the already known information about the position. The correction of the phase difference between the probe light and the pumping light includes an adjustment that utilizes the difference value between the measured phase difference and the already known phase difference and an adjustment that matches the measured BGS with the already known BGS.

In the case of the adjustment that utilizes the difference value between the measured phase difference and the already known phase difference, the optical fiber characteristic distribution sensor according to the present invention comprises a light source system, an optical fiber section, a phase difference adjusting section, a spectrum measuring section, a phase difference offset calculating section, a position calculating section, a characteristic calculating section, and a characteristic distribution calculating section.

The light source system outputs probe light and pumping light. At least part of the optical fiber section is placed in an object to be measured and both ends thereof are optically connected to the light source system such that the probe light is inputted from one end thereof and the pumping light is inputted from the other end thereof. The optical fiber section also includes a marker portion arranged at a predetermined position. For the marker portion, as reference data relating to the shape of the BGS of the probe light that has obtained gain due to the Brillouin scattering that occurs accompanying the propagations of the probe light and the pumping light, data relating to the shape of the BGS has been preliminarily measured in a state where the optical fiber section is placed in a normal state. The phase difference adjusting section adjusts the phase difference between the probe light and the pumping light outputted from the light source system. The spectrum measuring section measures data relating to the BGS shape while receiving the probe light that has obtained the gain due to the Brillouin scattering that occurs accompanying the propagations of the probe light and the pumping light as the outputted light from the optical fiber section. The phase difference offset calculating section calculates a difference between the phase difference at the time of measurement of the probe light and the pumping light at the time that the BGS that reflects the gain that has occurred in the marker portion is measured by the spectrum measuring section, and calculates the reference phase difference between the probe light and the pumping light at the rime that the reference data relating to the marker portion is measured. The position calculating section determines the occurrence position of the measured BGS by utilizing count information provided by a clock. The characteristic calculating section extracts characteristic information (temperature or distortion) of each portion in the optical fiber section from the data relating to the shape for each BGS measured by the spectrum measuring section. The characteristic distribution calculating section calculates the characteristic distribution along the longitudinal direction of the optical fiber section, from the information about the occurrence position calculated by the position calculating section together with the information about the characteristics calculated by the characteristic calculating section.

Particularly, in the optical fiber characteristic distribution sensor according to the present invention, the phase difference adjusting section adjusts the phase difference between the probe light and the pumping light outputted from the light source system by shifting the scanning range of phase difference by a difference value calculated by the phase difference offset calculating section. That is, because the phase difference adjusting section shifts the scanning range of the phase difference by an amount corresponding to the change in phase difference between the probe light and the pumping light outputted from the light source system, the error in the gain occurrence position calculated by the position calculating section is corrected by an amount corresponding to the shift.

In the case of the adjustment that utilizes the difference value between the measured phase difference and the already known phase difference, the optical fiber characteristic distribution sensor according to the present invention may comprise, in addition to the light source system, the optical fiber section, the phase difference adjusting section, the spectrum measuring section, the phase difference offset calculating section, the position calculating section, the characteristic calculating section, and the characteristic distribution calculating section described above, an optical delay device providing a delay to at least one of the probe light and the pumping light, and a delay adjusting section adjusting a delay provided to the optical delay device. In this case, the delay adjusting section adjusts a delay given to the optical delay device, on the basis of on the difference value calculated by the phase difference offset calculating section.

Further, the optical fiber characteristic distribution sensor according to the present invention may comprise a clock that provides a count to obtain the positional information when calculating the characteristic distribution along the longitudinal direction of the optical fiber section. In this case, a count as positional information is provided by the clock and the phase difference between the probe light and the pumping light outputted from the light source system is adjusted for each provided count. The probe light and the pumping light outputted from the light source system are caused to enter the optical fiber section in opposite directions. The Brillouin scattering light occurs accompanying the propagations of the probe light and the pumping light, and the probe light that has obtained gain due to the Brillouin scattering that has occurred is outputted from the optical fiber section. The data relating to the BGS shape is measured by the spectrum measuring section for each count. The optical fiber section is provided with the marker portion, and the data relating to the shape of the BGS of the gain that has occurred in the marker portion has been preliminarily obtained as the reference data (measured in a state where the optical fiber section is at a predetermined temperature and is placed in a normal state where distortion is not applied thereto). In addition, the difference between the phase difference at the time of measurement of probe light and pumping light when the BGS that reflects the gain that has occurred in the marker portion is measured by the spectrum measuring section and the reference phase difference between probe light and pumping light when the reference data relating to the marker portion is measured is calculated by the phase difference offset calculating section. Then, the occurrence position of the BGS is determined by the position calculating section based on the count provided by the clock. The information about the characteristics (temperature or distortion) is extracted from the data relating to the shape of the measured BGS by the characteristic calculating section, and the characteristic distribution is calculated by the characteristic distribution calculating section from the information about the occurrence position calculated by the position calculating section together with the characteristic information calculated by the characteristic calculating section. Further, by shifting the scanning range of the phase difference by the difference value calculated by the phase difference offset calculating section, the phase difference between the probe light and the pumping light outputted from the light source system is adjusted by the phase difference adjusting section. Due to this configuration, the measurement errors of position are reduced.

In the case of the adjustment that matches the measured BGS with the already known BGS, the optical fiber characteristic distribution sensor according to the present invention may comprise a light source system, a phase difference adjusting section, an optical delay device, an optical fiber section, a spectrum measuring section, a position calculating section, a characteristic calculating section, a characteristic distribution calculating section, and a delay adjusting section.

The light source system outputs probe light and pumping light. The phase difference adjusting section adjusts the phase difference between the probe light and the pumping light outputted from the light source system. The optical delay device provides a delay to at least one of the probe light and the pumping light. At least part of the optical fiber is placed in an object to be measured and both ends thereof are optically connected to the light source system such that the probe light is inputted from one end thereof and the pumping light is inputted from the other end thereof. The optical fiber section also includes a marker portion arranged at a predetermined position. For the marker portion, as reference data relating to the shape of the BGS of the probe light that has obtained gain due to the Brillouin scattering that occurs accompanying the propagations of the probe light and the pumping light, data relating to the shape of the BGS has been preliminarily measured in a state where the optical fiber section is placed in a normal state. The spectrum measuring section receives the probe light that has obtained the gain due to the Brillouin scattering that occurs accompanying the propagations of the probe light and the pumping light as the outputted light from the optical fiber section, and measures data relating to the shape of the BGS, which is a spectrum of the gain the received probe light has obtained due to the Brillouin scattering. The position calculating section calculates the occurrence position of the BGS measured by the spectrum measuring section, on the basis of the phase difference between probe light and the pumping light having been adjusted by the phase difference adjusting section. The characteristic calculating section extracts characteristic information (temperature or distortion) of each portion in the optical fiber section from the data relating to the shape of the BGS measured by the spectrum measuring section. The characteristic distribution calculating section calculates the characteristic distribution along the longitudinal direction of the optical fiber section, from the information about the occurrence position calculated by the position calculating section together with the information about the characteristics calculated by the characteristic calculating section. Then, the delay adjusting section adjusts the delay given by the optical delay device such that the measured data relating to the shape of the BGS in the marker portion matches with the reference data.

Due to such a structure described above, in the present invention, the probe light and the pumping light the phase difference between which has been adjusted by the phase difference adjusting section are outputted from the light source system. At least one of the probe light and the pumping light is provided with a delay by the optical delay device. After that, the probe light and the pumping light are inputted into the optical fiber section in opposite directions and the propagations of the probe light and the pumping light cause Brillouin scattering light to occur in the optical fiber section. Then, the probe light that has obtained the gain due to the Brillouin scattering that has occurred is outputted from the optical fiber section. Data relating to the shape of the BGS is measured by the spectrum measuring section. In addition, the occurrence position of BGS is calculated by the position calculating section, on the basis of the phase difference adjusted by the phase difference adjusting section. Information about the characteristics (temperature or distortion) is extracted from the data relating to the shape of the measured BGS by the characteristic calculating section. Further, the characteristic distribution along the longitudinal direction of the optical fiber section is calculated by the characteristic distribution calculating section, from the information about the occurrence position together with the information about the characteristics calculated, respectively. The data relating to the shape of the BGS of the gain that has occurred in the marker portion provided in the optical fiber section has been preliminarily obtained as the reference data (measured in a state where the optical fiber section is at a predetermined temperature and is placed in a normal state where distortion is not applied thereto). The delay provided by the optical delay device is adjusted by the delay adjusting section such that the measured data relating to the shape of the BGS in the marker portion matches with the reference data. Consequently, in this configuration also, the measurement errors of position in the characteristic distribution measurement are reduced effectively.

As described above, the adjustment that matches the measured BGS with the already known BGS can also be realized by the optical fiber characteristic distribution sensor comprising the light source system, the optical fiber section, the phase difference adjusting section, the spectrum measuring section, the phase difference offset calculating section, the position calculating section, the characteristic calculating section, and the characteristic distribution calculating section. In this case, the phase difference adjusting section adjusts the phase difference between the probe light and the pumping light outputted from the light source system such that the measured data relating to the shape of the Brillouin gain spectrum in the marker portion matches with the reference data preliminarily measured. In this configuration also, the measurement errors of position in the characteristic distribution measurement are reduced effectively.

Further, the optical fiber characteristic distribution sensor according to the present invention may comprise the light source system, the phase difference adjusting section, the optical fiber section, the spectrum measuring section, the phase difference offset calculating section, the position calculating section, the characteristic calculating section, and the characteristic distribution calculating section.

The light source system outputs probe light and pumping light. The phase difference adjusting section adjusts the phase difference between the probe light and the pumping light outputted from the light source system. At least part of the optical fiber is placed in an object to be measured and both ends thereof are optically connected to the light source system such that the probe light is inputted from one end thereof and the pumping light is inputted from the other end thereof. The optical fiber section also includes a marker portion arranged at a predetermined position. For the marker portion, as reference data relating to the shape of the BGS of the probe light that has obtained gain due to the Brillouin scattering that occurs accompanying the propagations of the probe light and the pumping light, data relating to the shape of the BGS has been preliminarily measured in a state where the optical fiber section is placed in a normal state. The spectrum measuring section receives the probe light that has obtained the gain due to the Brillouin scattering that occurs accompanying the propagation of probe light and pumping light as the outputted light from the optical fiber section, and measures data relating to the shape of the BGS, which is a spectrum of the gain the received probe light has obtained due to the Brillouin scattering. The phase difference offset calculating section calculates a difference between the phase difference at the time of measurement of the probe light and the pumping light at the time that the BGS that reflects the gain that has occurred in the marker portion is measured by the spectrum measuring section, and the reference phase difference between the probe light and the pumping light at the time that the reference data relating to the marker portion is measured. The position calculating section calculates the occurrence position of the BGS measured by the spectrum measuring section, on the basis of the phase difference between the probe light and the pumping light that have been adjusted by the phase difference adjusting section together with the difference value calculated by the phase difference offset calculating section. The characteristic calculating section extracts characteristic information (temperature or distortion) of each portion in the optical fiber section from the data relating to the shape of the BGS measured by the spectrum measuring section. Then, the characteristic distribution calculating section calculates the characteristic distribution along the longitudinal direction of the optical fiber section, from the information about the occurrence position calculated by the position calculating section and together with information about the characteristic calculated by the characteristics calculating section.

Due to such a structure described above, in the present invention, the probe light and the pumping light, whose phase difference has been adjusted by the phase difference adjusting section, are outputted from the light source system. After that, the probe light and the pumping light are inputted into the optical fiber section in opposite directions, and accompanying the propagations of the probe light and the pumping light, Brillouin scattering light is caused to occur in the optical fiber section. The probe light that has obtained the gain due to the Brillouin scattering that has occurred is outputted from the optical fiber section. Data relating to the shape of the BGS of the Brillouin scattering light is measured by the spectrum measuring section. The data relating to the shape of the BGS of the gain that has occurred in the marker portion provided in the optical fiber section has been preliminarily obtained as the reference data (measured in a state where the optical fiber section is at a predetermined temperature and is placed in a normal state where distortion is not applied thereto). The phase difference offset calculating section calculates the difference of the measured phase difference between the probe light and the pumping light at the time that the measurement data relating to the shape of the BGS at the marker portion is obtained and the reference phase difference between the probe light and the pumping light at the time that the reference data has been preliminarily measured calculated by the phase difference offset calculating section. The occurrence position of BGS is calculated by the position calculating section based on the phase difference adjusted by the phase difference adjusting section and the difference value calculated by the phase difference offset calculating section. Information about the characteristics is extracted from the data relating to the shape of the measured BGS by the characteristic calculating section. Then, the characteristic distribution is calculated by the characteristic distribution calculating section from the information about the occurrence position and the information about the characteristics calculated respectively in this manner. In this configuration also, the measurement errors of position in the characteristic distribution measurement are reduced effectively.

It is preferable for the phase difference adjusting section to adjust the phase difference between the probe light and the pumping light outputted from the light source system by shifting the scanning range of phase difference by a difference value calculated by the phase difference offset calculating section.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

Effects of the Invention

In accordance with the present invention, it is possible to reduce measurement errors of position in temperature distribution measurement.

BRIEF DESCRIPTION OF THE DRAWINGS

FIG. 4 is a view showing a configuration of a third embodiment of an optical fiber characteristic distribution sensor according to the present invention.

Figure 1:
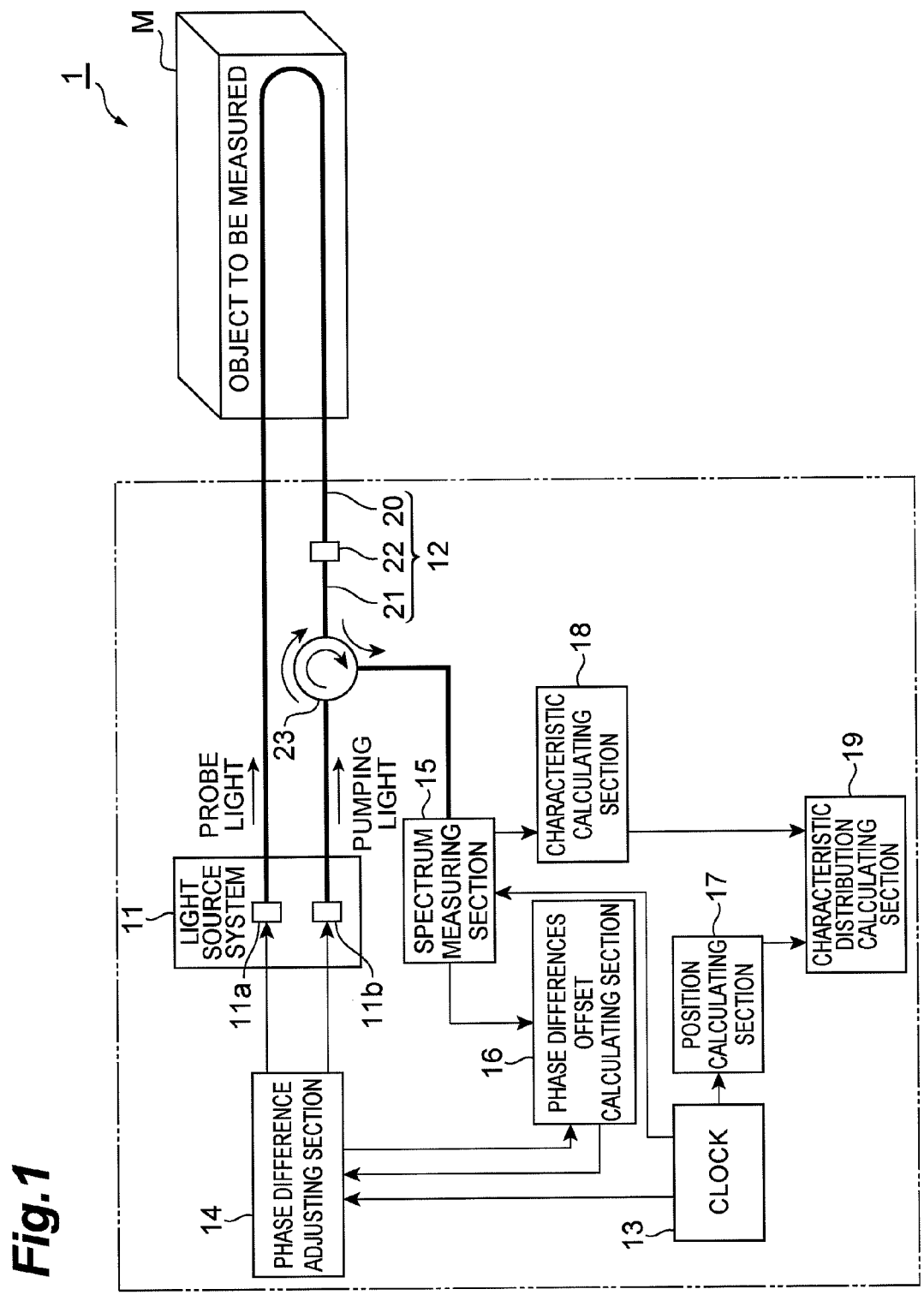
FIG. 1 is a view showing a first embodiment of an optical fiber characteristic distribution sensor according to the present invention.

DESCRIPTION OF THE REFERENCE NUMERALS 1-3 . . . optical fiber characteristic distribution sensor; 11 . . . light source; 12 . . . optical fiber section; 13 . . . clock; 14 . . . phase difference adjusting section; 15 . . . spectrum measuring section; 16 . . . phase difference offset calculating section; 17, 17a, 17b . . . position calculating section; 18 . . . characteristic calculating section; 19 . . . characteristic distribution calculating section; 20 . . . first optical fiber; 21 . . . second optical fiber; 22 . . . marker portion; 31 . . . optical delay device; and 32 . . . delay adjusting section.

BEST MODES FOR CARRYING OUT THE INVENTION

In the following, embodiments of an optical fiber characteristic distribution sensor according to the present invention will be explained in detail with reference to FIGS. 1 to 4. In the description of the drawings, identical or corresponding components are designated by the same reference numerals, and overlapping description is omitted.

First Embodiment

FIG. 1 is a view showing a configuration of a first embodiment of an optical fiber characteristic distribution sensor according to the present invention. An optical fiber characteristic distribution sensor 1 according to the first embodiment is a device that utilizes an optical fiber section 12 as a sensor, which is arranged in a state where part of the optical fiber section 12 is in contact with an object to be measured M, and measures the temperature distribution or the distortion distribution of the object to be measured M based on data relating to the shape of the BGS of Brillouin scattering light outputted from the optical fiber section 12.

The Brillouin scattering light is scattering light that is down-converted in a direction opposite to the direction in which pumping light travels due to the interaction between the pumping light inputted into an optical fiber and an acoustic wave that occurs in the optical fiber resulting from the pumping light. The Brillouin scattering light occurs at a position indicative of the correlation peak between the inputted probe light and pumping light when the probe light and the pumping light are inputted into the optical fiber in opposite directions. The BGS is a gain spectrum that the probe light receives due to the Brillouin scattering.

Figure 2:
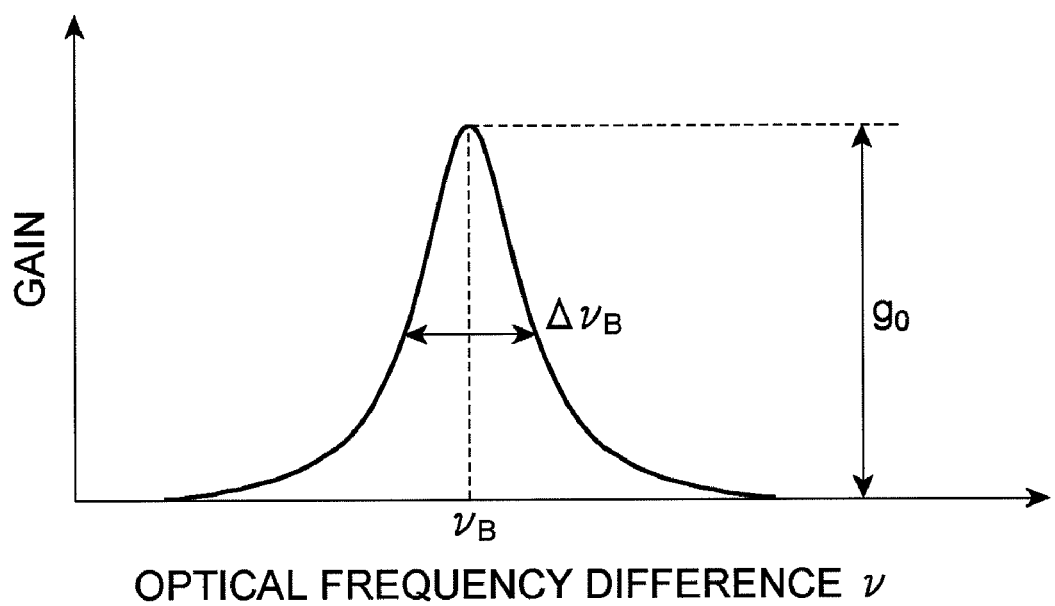
FIG. 2 is a graph showing BGS.

FIG. 2 is a graph showing the BGS. As shown in FIG. 2, the BGS is expressed by a Lorentz function in Formula (1), where $\nu$ represents the optical frequency difference between probe light and pumping light.

$$g_B(\nu) = \frac{g_0}{1 + \{2(\nu - \nu_B)/\Delta\nu_B\}^2} \quad (1)$$

In Formula (1), $g_0$ represents the maximum gain, $\nu_B$ represents the center frequency, and $\Delta\nu_B$ represents the line width (full width at half maximum). The maximum gain $g_0$, the center frequency $\nu_B$, and the line width $\Delta\nu_B$ are parameters that characterize the BGS. These parameters change depending on the temperature of the occurrence position where the gain has occurred in the optical fiber.

By changing the phases of probe light and pumping light, the position indicative of the correlation peak moves and it is possible to cause a gain to occur at each position along the longitudinal direction of the optical fiber. The optical fiber characteristic distribution sensor 1 calculates the characteristics of an object to be measured, such as information about temperature or distortion at the gain occurrence position based on the center frequency of the BGS by measuring the BGS in which the gain that has occurred at each position of the optical fiber section 12 is reflected. Further, each gain occurrence position is calculated based on the phase difference between probe light and pumping light. In this manner, the optical fiber characteristic distribution sensor 1 measures the characteristic distribution along the longitudinal direction of the optical fiber section 12. The characteristic distribution includes at least distortion distribution, temperature distribution, etc.

Next, the configuration of the optical fiber characteristic distribution sensor 1 is explained in detail with reference to FIG. 1. As an example of the configuration of the optical fiber characteristic distribution sensor 1 according to the first embodiment, a configuration including a clock is explained below. The optical fiber characteristic distribution sensor 1 comprises a light source system 11, an optical fiber section 12, a clock 13, a phase difference adjusting section 14, a spectrum measuring section 15, a phase difference offset calculating section 16, a position calculating section 17, a characteristic calculating section 18, and a characteristic distribution calculating section 19. Although it is also possible for the light source system 11 to generate probe light and pumping light using only one light source as disclosed in the above-mentioned non-patent document, in each of the following embodiments, as the configuration of the light source system 11, a configuration is shown, which includes a light source 11*a* for outputting probe light and a light source 11*b* for outputting pumping light.

As described above, the light source system 11 includes the light source 11*a* for outputting the probe light and the light source 11*b* for outputting the pumping light.

The optical fiber section 12, part of which is installed in the object to be measured M, is optically connected to the light source system 11 such that the probe light outputted from the light source 11*a* is inputted into one end and the pumping light outputted from the light source 11*b* is inputted into the other end. From the optical fiber section 12, probe light that has obtained gain due to the Brillouin scattering that occurs accompanying the propagations of the probe light and the pumping light is outputted. The optical fiber section 12 includes a first optical fiber 20 and a second optical fiber 21 connected in series to each other. The zero-dispersion wavelength of the first optical fiber 20 is 1,310 nm and the zero-dispersion wavelength of the second optical fiber 20 is 1,550 nm.

The BGS in which the gain that has occurred in a marker portion 22, which is a connection portion of the first optical fiber 20 and the second optical fiber 21, is reflected has been preliminarily measured in a state where the optical fiber section 12 is normal (a state where a predetermined temperature is maintained and unnecessary distortion is not applied), and the measured data relating to the shape of the BGS is obtained as reference data. The marker portion 22 is colored in such a manner that the color of coating is different from others such that it can be distinguished by outside appearance. The region of the optical fiber section 12 installed in the object to be measured M (region to be measured) may be immersed or embedded in the object to be measured M.

The clock 13 provides a count to obtain positional information when calculating the characteristic distribution.

The phase difference adjusting section 14 adjusts the phase difference between probe light and pumping light outputted from the light source system 11 for each count. The phase difference adjusting section 14 adjusts the phase difference between probe light and pumping light outputted from the light source system 11 by shifting the scanning range of the phase difference by a difference value of the phase difference calculated by the phase difference offset calculating section 16. The phase difference adjusting section 14 may adjust the phase of probe light and the phase of pumping light, respectively, or adjust the phase of one of light while fixing the phase of the other light. In addition, the phase difference adjusting section 14 may have a configuration in which the phase difference adjusting section 14 outputs an indication value that specifies the phase difference between probe light and pumping light and the light source system 11 sets the phase difference between probe light and pumping light according to the indication value.

The spectrum measuring section 15 receives probe light outputted from the optical fiber section 12 via a circulator 23 and measures data relating to the shape of the BGS for each count provided by the clock 13. The data relating to the shape of the BGS refers to data relating to the parameters that characterize the shape of the BGS, numerical values indicative of the shape of other peaks (for example, the gradient value of a portion at which the gain from the center frequency decreases), and a peculiar shape of the spectrum of the center frequency difference between two peak portions etc. In this embodiment, the center frequency is used as an example.

The phase difference offset calculating section 16 calculates a difference between the reference phase difference and the measured phase difference. That is, the phase difference offset calculating section 16 calculates a difference between the phase difference (reference phase difference) between probe light and pumping light when the reference data relating to the marker portion 22 has been preliminarily obtained as described above, and the phase difference (phase difference at the time of measurement) between probe light and pumping light when the data relating to the shape of the BGS in which the gain that has actually occurred in the marker portion 22 is reflected is measured.

The position calculating section 17 determines the occurrence position of the gain due to the Brillouin scattering based on the count provided by the clock 13.

The characteristic calculating section 18 extracts information about the characteristics, such as temperature and distortion, from the data relating to the shape of the measured BGS.

The characteristic distribution calculating section 19 calculates the characteristic distribution along the longitudinal direction of the optical fiber section 12 from the information about the occurrence position calculated by the position calculating section 17 and the information about the characteristics calculated by the characteristic calculating section 18.

Next, the operation of the optical fiber characteristic distribution sensor 1 is explained.

First, probe light and pumping light are inputted from the light source system 11 to the optical fiber section 12 in opposite directions. From the optical fiber section 12, the probe light that has obtained the gain due to the Brillouin scattering that occurs accompanying the propagation of the probe light and the pumping light is outputted. Then, the probe light is received by the spectrum measuring section 15 and the data relating to the BGS shape is measured for each count provided by the clock 13.

When the data relating to the shape of the BGS in which the gain that has actually occurred in the marker portion 22 is reflected is measured, the phase difference offset calculating section 16 calculates a difference between the reference phase difference between probe light and pumping light when the reference data relating to the marker portion 22 has been preliminarily obtained as described above, and the phase difference at the time of measurement.

The phase difference adjusting section 14 adjusts the phase difference between probe light and pumping light outputted from the light source system 11 by shifting the scanning range of the phase difference by a difference value of the phase difference calculated by the phase difference offset calculating section 16. In a state where the phase difference between probe light and pumping light is adjusted as described above, the gain is caused to occur at each position in the region to be measured of the optical fiber section 12 and then data relating to the shape of the BGS in which the gain is reflected is measured sequentially. Then, the occurrence position of the gain due to the Brillouin scattering is determined by the position calculating section 17 based on the count provided by the clock 13.

The information about the characteristics (temperature, distortion, etc.) is extracted by the characteristic calculating section 18 from the shape data of the BGS measured by the spectrum measuring section 15 for each count provided by the clock 13. In addition, the characteristic distribution is calculated by the characteristic distribution calculating section 19 from the information about the occurrence position calculated by the position calculating section 17 and the information about the characteristics calculated by the characteristic calculating section 18.

Incidentally, the injection current outputted from a waveform generator and the optical frequency response characteristic of the DFB-LD for the injection current change with the passage of time. Further, when the tensile to be provided to the delay optical fiber changes or the temperature changes, the optical path length of probe light changes accordingly. When the optical path length of probe light changes, the phase difference between probe light and pumping light changes. As a result, even if the phase difference between probe light and pumping light is set, the actual phase difference changes and the gain occurrence position also changes.

In the optical fiber characteristic distribution sensor 1 according to the first embodiment, the phase difference between probe light and pumping light is adjusted by utilizing the information at the time of measurement relating to the marker portion in the optical fiber section 12 and the already known information preliminarily measured. That is, when the data relating to the shape of the BGS in which the gain that has actually occurred in the marker portion 22 is reflected is measured, the phase difference offset calculating section 16 calculates a difference between the reference phase difference between probe light and pumping light when the reference data relating to the marker portion 22 has been preliminarily obtained as described above, and the phase difference at the time of measurement. The phase difference adjusting section 14 adjusts the phase difference between probe light and pumping light outputted from the light source system 11 by shifting the scanning range of the phase difference by a difference value of the phase difference calculated by the phase difference offset calculating section 16. As a result, it is made possible to effectively reduce the measurement errors of the position where the gain due to the Brillouin scattering occurs in the characteristic distribution measurement.

That is, in the first embodiment, because the phase difference adjusting section 14 shifts the scanning range of phase difference by an amount of change of phase difference between probe light and pumping light outputted from the light source system 11, it is possible to correct the errors of the gain occurrence position calculated by the position calculation position 17 by the amount of shift. If it is assumed that the phase difference at the time of measurement is A1, the already known phase difference is A2, and the difference between the phase differences is ΔA, by shifting the scanning range in which the phase difference is scanned by ΔA, where ΔA=A1-A2, it is made possible to measure the characteristics in the range (region to be measured) supposed initially.

When the two or more marker portions 22 exist, it is only required to shift the scanning range of phase difference using the maximum ΔA among the necessary target markers. When the phase difference corresponding to the position of the marker portion 22 exists at the end of the range in which the phase difference is shifted, the setting is made such that the phase difference at the time of measurement of the marker portion 22 exists at the end of the shift range.

In the first embodiment, it is preferable that the light source system 11, the optical fiber section 12, the clock 13, the phase difference adjusting section 14, the spectrum measuring section 15, the phase difference offset calculating section 16, the position calculating section 17, the characteristic calculating section 18, and the characteristic distribution calculating section 19 be housed in a case.

In the first embodiment, the marker portion 22 is the connection portion of the first optical fiber 20 and the second optical fiber, however, it may also be a portion to which distortion is given by an external force. At a position where the marker portion 22 may be subjected to the thermal influence or the influence of distortion, it is preferable for the marker portion 22 to be in a form in which different kinds of fibers are connected.

Second Embodiment

Figure 3:
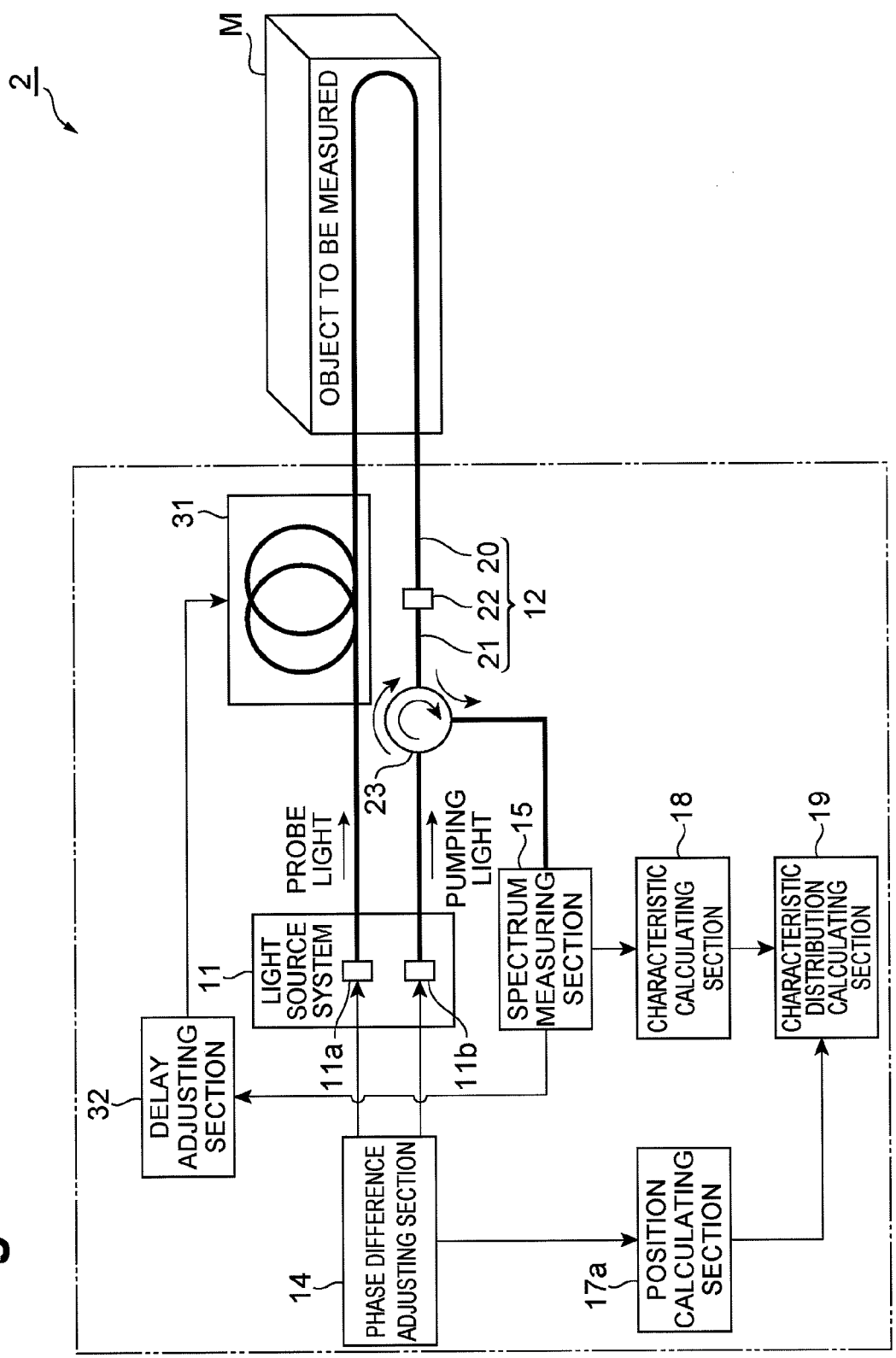
FIG. 3 is a view showing a configuration of a second embodiment of an optical fiber characteristic distribution sensor according to the present invention.

FIG. 3 is a view showing a configuration of a second embodiment of an optical fiber characteristic distribution sensor according to the present invention. An optical fiber characteristic distribution sensor 2 according to the second embodiment comprises the light source system 11, the phase difference adjusting section 14, an optical delay device 31, the optical fiber section 12, the spectrum measuring section 15, a position calculating section 17a, the characteristic calculating section 18, the characteristic distribution calculating section 19, and a delay adjusting section 32. The light source system 11, the phase difference adjusting section 14, the optical fiber section 12, the spectrum measuring section 15, the characteristic calculating section 18, and the characteristic distribution calculating section 19 function in a manner similar to those in the above-described first embodiment.

The position calculating section 17a calculates the occurrence position of the gain due to the Brillouin scattering based on the phase difference adjusted by the phase difference adjusting section 14.

The optical delay device 31 gives a delay to the probe light outputted from the light source 11a included in the light source system 11. The delay adjusting section 32 adjusts the optical delay device 31 such that the measured data relating to the shape of BGS in the marker portion 22 matches with the above-described reference data. That is, the delay adjusting section 32 sets an optimum delay amount while shifting the delay amount such that the data relating to the shape of the BGS measured by the spectrum measuring section 15 matches with the already known reference data preliminarily measured in a normal state.

Next, the operation of the optical fiber characteristic distribution sensor 2 is explained.

First, probe light and pumping light are outputted from the light source system 11. The probe light and the pumping light outputted from the light source system 11 are inputted into the optical fiber section 12 in opposite directions. From the optical fiber section 12, the probe light that has obtained the gain due to the Brillouin scattering that occurs accompanying the propagation of the probe light and the pumping light is outputted. The spectrum measuring section 15 receives the probe light outputted from the optical fiber section 12 and measures the data relating to the BGS shape.

A delay is provided to the probe light by the optical delay device 31 adjusted by the delay adjusting section 32 such that the measured data relating to the BGS shape in the marker portion 22 matches with the reference data preliminarily measured. In this manner, a gain is caused to occur in the region to be measured of the optical fiber section 12 (a part of the optical fiber section 12 installed in a state of being in contact with the object to be measured M) in a state where the phase difference is substantially adjusted by the adjustment of delay, and then data relating to the BGS shape is measured.

Then, the occurrence position of the gain due to the Brillouin scattering is calculated by the position calculating section 17a based on the phase difference adjusted by the phase difference adjusting section 14. The information about the characteristics (temperature, distortion, etc.) is extracted by the characteristic calculating section 18 from the data relating to the shape of the measured BGS. The characteristic distribution is calculated by the characteristic distribution calculating section 19 from the information about the occurrence position calculated by the position calculating section 17a and the information about the characteristics calculated by the characteristic calculating section 18.

When the tensile provided to the delay optical fiber (included in the optical delay device 31) changes or the temperature changes, the optical path length of probe light changes. When the optical path length of probe light changes, the phase difference between probe light and pumping light changes. For example, when the temperature of the delay optical fiber that constitutes the optical delay device 31 changes by 5° C., the occurrence position of the gain due to the Brillouin scattering moves about 30 cm. As a result, even if the phase difference between probe light and pumping light is set once, the actual phase difference changes and the gain occurrence position changes accordingly.

As described above, in the optical fiber characteristic distribution sensor 2 according to the second embodiment, the delay provided by the optical delay device 31 is adjusted by the delay adjusting section 32 and the phase difference between probe light and pumping light is adjusted such that the data relating to the shape of the measured BGS matches with the already known reference data. That is, by causing a gain to occur in the region to be measured of the optical fiber section 12 in a state where the phase difference is adjusted indirectly, the gain occurrence position and the measured BGS are correctly associated with each other. As a result, also in the second embodiment, it is possible to effectively reduce the measurement errors of the gain occurrence position in the measurement of characteristic distribution.

In the second embodiment, it may also be possible to comprise a phase difference offset calculating section as in the first embodiment described above. In this case, an amount of delay corresponding to the difference of the phase difference between probe light and pumping light calculated by the phase difference offset calculating section is adjusted by the delay adjusting section 32. On the other hand, in the first embodiment, the difference of the phase difference between probe light and pumping light calculated by the phase difference offset calculating section may be adjusted by the phase difference adjusting section 14 by shifting the phase difference between probe light and pumping light (such that the date relating to the shape of the measured BGS matches with the already known reference data).

Third Embodiment

FIG. 4 is a view showing a configuration of a third embodiment of an optical fiber characteristic distribution sensor according to the present invention. The optical fiber characteristic distribution sensor 3 according to the third embodiment comprises the light source system 11, the phase difference adjusting section 14, the optical fiber section 12, the spectrum measuring section 15, the phase difference offset calculating section 16, a position calculating section 17b, the characteristic calculating section 18, and the characteristic distribution calculating section 19. The light source system 11, the phase difference adjusting section 14, the optical fiber section 12, the spectrum measuring section 15, the phase difference offset calculating section 16, the characteristic calculating section 18, and the characteristic distribution calculating section 19 function in a manner similar to those in the above-described first and second embodiments.

The position calculating section 17b calculates the occurrence position of the gain due to the Brillouin scattering based on the phase difference between the probe light and the pumping light adjusted by the phase difference adjusting section 14 and the difference of the phase difference calculated by the phase difference offset calculating section.

Next, the operation of the optical fiber characteristic distribution sensor 3 will be explained.

First, probe light and pumping light are outputted from the light source system 11. The probe light and the pumping light outputted from the light source system 11 are inputted into the optical fiber section 12 in opposite directions. From the optical fiber section 12, the probe light that has obtained the gain due to the Brillouin scattering that occurs accompanying the propagation of the probe light and the pumping light is outputted. The spectrum measuring section 15 receives the probe light outputted from the optical fiber section 12 and measures the data relating to the BGS shape.

When the data relating to the shape of the BGS in which the gain that has actually occurred in the marker portion 22 is reflected is measured, the phase difference offset calculating section 16 calculates a difference between the reference phase difference between probe light and pumping light when the reference data relating to the marker portion 22 has been preliminarily obtained as described above, and the phase difference at the time of measurement.

After that, a gain is caused to occur in the region to be measured of the optical fiber section 12 (a part of the optical fiber section 12 installed in a state of being in contact with the object to be measured M) and data relating to the BGS shape at the gain occurrence position is measured. Then, the gain occurrence position is determined by the position calculating section 17b based on the difference between the phase difference between probe light and pumping light adjusted by the phase difference adjusting section 14 and the phase difference calculated by the phase difference offset calculating section 16.

In addition, the characteristic calculating section 18 extracts the information about the characteristics (temperature, distortion, etc.) from the data relating to the shape of the measured BGS. In this manner, the characteristic distribution is calculated by the characteristic distribution calculating section 19 from the information about the gain occurrence position calculated by the position calculating section 17b and the information about the characteristics calculated by the characteristic calculating section 18.

As described above, the position is determined by the position calculating section 17b based on the difference between the phase difference adjusted by the phase difference adjusting section 14 and the phase difference calculated by the phase difference offset calculating section 16, and therefore, it is possible to effectively reduce the measurement errors of the gain occurrence position in the measurement of characteristic distribution.

In the first to third embodiments described above, the two light sources 11a, 11b are used as the light source system 11, however, the number of light sources may be one and in such a case, a period of pumping light and a period of probe light are set on the time axis and the optical frequency is adjusted for each period.

In the first to third embodiments described above, it may also be possible to provide a plurality of marker portions along the longitudinal direction of the optical fiber section 12 by alternately connecting a plurality of the first optical fibers and a plurality of the second optical fibers. In this case, a phase difference offset is calculated for each marker portion. As a method of correction, for example, a section is set in each marker portion, in which the position is corrected, and then the position is corrected with each marker portion as a reference point in each section. It may also be possible to correct the position based on, for example, the average value of the phase difference offset corresponding to each marker portion. Further, it may also be possible to correct the position by shifting the scanning range of phase difference by an amount corresponding to the maximum value of the phase difference offset corresponding to each marker portion, setting a section in which the position is corrected in each marker portion, and using the marker portion as a reference point in each section. Correction may be carried out arbitrarily as the need arises.

In the first to third embodiments described above, the measurement of characteristic distribution of temperature, distortion, etc., is explained, however, it is also possible to measure other characteristic distributions using the optical fiber characteristic distribution sensors 1 to 3.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The optical fiber characteristic distribution sensors according to the present invention can be made use of for a sensing technique in which the characteristics of an object, such as distortion and temperature, are detected using an optical fiber arranged in a state of being in contact with the object, and can also be applied to a characteristic detection system of an object using Brillouin scattering light. In particular, the sensors according to the present invention can be applied to a system for measuring/detecting deformations or environmental temperatures of various buildings, etc.

The invention claimed is:

1. An optical fiber characteristic distribution sensor, comprising:
a light source system for outputting probe light and pumping light;
a phase difference adjusting section for adjusting the phase difference between the probe light and the pumping light outputted from the light source system;
an optical fiber section at least part of which is placed in an object to be measured and both ends of which are optically connected to the light source system such that the probe light is inputted from one end thereof and the pumping light is inputted from the other end thereof, said optical fiber section including a marker portion where, as reference data relating to the shape of the Brillouin gain spectrum of the probe light that has obtained gain due to the Brillouin scattering that occurs accompanying the propagations of the probe light and the pumping light, data relating to the shape of the Brillouin gain spectrum has been preliminarily measured in a state where the optical fiber section is placed in a normal state;
a spectrum measuring section for receiving the probe light that has obtained the gain due to the Brillouin scattering that occurs accompanying the propagations of the probe light and the pumping light as the outputted light from the optical fiber section, and for measuring data relating to the shape of the Brillouin gain spectrum that the received probe light has obtained due to the Brillouin scattering;
a phase difference offset calculating section for calculating a difference between the phase difference at the time of measurement between the probe light and the pumping light at the time that the Brillouin gain spectrum that reflects the gain that has occurred in the marker portion is measured by the spectrum measuring section, and the reference phase difference between the probe light and the pumping light at the time that the reference data relating to the marker portion is measured;
a position calculating section for determining the occurrence position of the Brillouin gain spectrum measured by the spectrum measuring section;
a characteristic calculating section for extracting characteristic information of each portion in the optical fiber section from the data relating to the shape for each Brillouin gain spectrum measured by the spectrum measuring section; and
a characteristic distribution calculating section for calculating the characteristic distribution along the longitudinal direction of the optical fiber section, from the information about the occurrence position calculated by the position calculating section together with the information about the characteristics calculated by the characteristic calculating section,
wherein the phase difference adjusting section adjusts the phase difference between the probe light and the pumping light outputted from the light source system by shifting the scanning range of phase difference by a difference value that is calculated by the phase difference offset calculating section.

2. An optical fiber characteristic distribution sensor, comprising:
a light source system for outputting probe light and pumping light;
a phase difference adjusting section for adjusting the phase difference between the probe light and the pumping light outputted from the light source system;
an optical delay device for providing at least one of the probe light and the pumping light with a delay;
an optical fiber section at least part of which is placed in an object to be measured and both ends of which are optically connected to the light source system such that the probe light is inputted from one end thereof and the pumping light is inputted from the other end thereof, said optical fiber section including a marker portion where, as reference data relating to the shape of the Brillouin gain spectrum of the probe light that has obtained gain due to the Brillouin scattering that occurs accompanying the propagations of the probe light and the pumping light, data relating to the shape of the Brillouin gain spectrum has been preliminarily measured in a state where the optical fiber section is placed in a normal state;

a spectrum measuring section for receiving the probe light that has obtained the gain due to the Brillouin scattering that occurs accompanying the propagations of the probe light and the pumping light as the outputted light from the optical fiber section, and for measuring data relating to the shape of the Brillouin gain spectrum that the received probe light has obtained due to the Brillouin scattering;

a phase difference offset calculating section for calculating a difference between the phase difference at the time of measurement between the probe light and the pumping light at the time that the Brillouin gain spectrum that reflects the gain that has occurred in the marker portion is measured by the spectrum measuring section, and for calculating the reference phase difference between the probe light and the pumping light at the time that the reference data relating to the marker portion is measured;

a position calculating section for determining the occurrence position of the Brillouin gain spectrum measured by the spectrum measuring section;

a characteristic calculating section for extracting characteristic information of each portion in the optical fiber section from the data relating to the shape for each Brillouin gain spectrum measured by the spectrum measuring section;

a characteristic distribution calculating section for calculating the characteristic distribution along the longitudinal direction of the optical fiber section, from the information about the occurrence position calculated by the position calculating section together with the information about the characteristics calculated by the characteristic calculating section; and a delay adjusting section for adjusting the delay provided by the optical delay device, on the basis of the difference value that is calculated by the phase difference offset calculating section.

3. An optical fiber characteristic distribution sensor according to claim 1, further comprising a clock for providing a count used to obtain positional information at the time of calculating the characteristic distribution along the longitudinal direction of the optical fiber section, wherein the phase difference adjusting section adjusts the phase difference between the probe light and the pumping light outputted from the light source system for each count provided by the clock, the spectrum measuring section measures data relating to the shape of the Brillouin gain spectrum for each count provided by the clock, and the position calculating section determines the occurrence position of the measured Brillouin gain spectrum by utilizing the count information provided by the clock.

4. An optical fiber characteristic distribution sensor, comprising:

a light source system for outputting probe light and pumping light;

a phase difference adjusting section for adjusting the phase difference between the probe light and the pumping light outputted from the light source system;

an optical delay device for providing at least one of the probe light and the pumping light with a delay;

an optical fiber section at least part of which is placed in an object to be measured and both ends of which are optically connected to the light source system such that the probe light is inputted from one end thereof and the pumping light is inputted from the other end thereof, said optical fiber section including a marker portion where, as reference data relating to the shape of the Brillouin gain spectrum of the probe light that has obtained gain due to the Brillouin scattering that occurs accompanying the propagations of the probe light and the pumping light, data relating to the shape of the Brillouin gain spectrum has been preliminarily measured in a state where the optical fiber section is placed in a normal state;

a spectrum measuring section for receiving the probe light that has obtained the gain due to the Brillouin scattering that occurs accompanying the propagations of the probe light and the pumping light as the outputted light from the optical fiber section, and for measuring data relating to the shape of the Brillouin gain spectrum, that is, a spectrum of gain, which the received probe light has obtained due to the Brillouin scattering;

a position calculating section for calculating the occurrence position of the Brillouin gain spectrum measured by the spectrum measuring section, on the basis of the phase difference between the probe light and the pumping light adjusted by the phase difference adjusting section;

a characteristic calculating section for extracting characteristic information of each portion in the optical fiber section from the data relating to the shape of the Brillouin gain spectrum measured by the spectrum measuring section;

a characteristic distribution calculating section for calculating the characteristic distribution along the longitudinal direction of the optical fiber section, from the information about the occurrence position calculated by the position calculating section together with the information about the characteristics calculated by the characteristic calculating section; and a delay adjusting section for adjusting the delay provided by the optical delay device such that the measured data relating to the shape of the Brillouin gain spectrum in the marker portion matches with the reference data preliminarily measured.

5. An optical fiber characteristic distribution sensor, comprising:

a light source system for outputting probe light and pumping light;

a phase difference adjusting section for adjusting the phase difference between the probe light and the pumping light outputted from the light source system;

an optical fiber section at least part of which is placed in an object to be measured and both ends of which are optically connected to the light source system such that the probe light is inputted from one end thereof and the pumping light is inputted from the other end thereof, said optical fiber section including a marker portion where, as reference data relating to the shape of the Brillouin gain spectrum of the probe light that has obtained gain due to the Brillouin scattering that occurs accompanying the propagations of the probe light and the pumping light, data relating to the shape of the Brillouin gain spectrum has been preliminarily measured in a state where the optical fiber section is placed in a normal state;

a spectrum measuring section for receiving the probe light that has obtained the gain due to the Brillouin scattering that occurs accompanying the propagations of the probe light and the pumping light as the outputted light from the optical fiber section, and for measuring data relating to the shape of the Brillouin gain spectrum, that is, a spectrum of gain, which the received probe light has obtained due to the Brillouin scattering;

a position calculating section for calculating the occurrence position of the Brillouin gain spectrum measured by the spectrum measuring section, on the basis of the phase difference between the probe light and the pumping light adjusted by the phase difference adjusting section;

a characteristic calculating section for extracting characteristic information of each part in the optical fiber section from the data relating to the shape of the Brillouin gain spectrum measured by the spectrum measuring section; and a characteristic distribution calculating section for calculating the characteristic distribution along the longitudinal direction of the optical fiber section, from the information about the occurrence position calculated by the position calculating section together with the information about the characteristics calculated by the characteristic calculating section, wherein the phase difference adjusting section adjusts the phase difference between the probe light and the pumping light outputted from the light source system such that the measured data relating to the shape of the Brillouin gain spectrum in the marker portion matches with the reference data preliminarily measured.

6. An optical fiber characteristic distribution sensor, comprising:

a light source system for outputting probe light and pumping light;

a phase difference adjusting section for adjusting the phase difference between the probe light and the pumping light outputted from the light source system;

an optical fiber section at least part of which is placed in an object to be measured and both ends of which are optically connected to the light source system such that the probe light is inputted from one end thereof and the pumping light is inputted from the other end thereof, said optical fiber section including a marker portion where, as reference data relating to the shape of the Brillouin gain spectrum of the probe light that has obtained gain due to the Brillouin scattering that occurs accompanying the propagations of the probe light and the pumping light, data relating to the shape of the Brillouin gain spectrum has been preliminarily measured in a state where the optical fiber section is placed in a normal state;

a spectrum measuring section for receiving the probe light that has obtained the gain due to the Brillouin scattering that occurs accompanying the propagations of the probe light and the pumping light as the outputted light from the optical fiber section, and for measuring data relating to the shape of the Brillouin gain spectrum, that is, a spectrum of gain, which the received probe light has obtained due to the Brillouin scattering;

a phase difference offset calculating section for calculating a difference between the phase difference at the time of measurement between the probe light and the pumping light at the time that the Brillouin gain spectrum that reflects the gain that has occurred in the marker portion is measured by the spectrum measuring section, and for calculating the reference phase difference between the probe light and the pumping light at the time that the reference data relating to the marker portion is measured;

a position calculating section for calculating the occurrence position of the Brillouin gain spectrum measured by the spectrum measuring section, on the basis of the phase difference between the probe light and the pumping light adjusted by the phase difference adjusting section together with the difference value calculated by the phase difference offset calculating section;

a characteristic calculating section for extracting characteristic information of each portion in the optical fiber section from the data relating to the shape of the Brillouin gain spectrum measured by the spectrum measuring section; and a characteristic distribution calculating section for calculating the characteristic distribution along the longitudinal direction of the optical fiber section, from the information about the occurrence position calculated by the position calculating section together with the information about the characteristics calculated by the characteristic calculating section.

7. An optical fiber characteristic distribution sensor according to claim 2, further comprising a clock for providing a count used to obtain positional information at the time of calculating the characteristic distribution along the longitudinal direction of the optical fiber section, wherein the phase difference adjusting section adjusts the phase difference between the probe light and the pumping light outputted from the light source system for each count provided by the clock, the spectrum measuring section measures data relating to the shape of the Brillouin gain spectrum for each count provided by the clock, and the position calculating section determines the occurrence position of the measured Brillouin gain spectrum by utilizing the count information provided by the clock.

* * * * *